United States Patent
Erickson

[11] Patent Number: 6,012,212
[45] Date of Patent: Jan. 11, 2000

[54] ROTARY MOLDED TANK WITH AGITATION PORTION

[76] Inventor: Craig M. Erickson, 7877 Alden Way NE., Fridley, Minn. 55432

[21] Appl. No.: 09/069,555

[22] Filed: Apr. 29, 1998

[51] Int. Cl.[7] .................................................. B29C 65/00
[52] U.S. Cl. ..................... 29/434; 29/898.08; 264/310; 264/311
[58] Field of Search ................ 29/434, 898.08; 264/310, 311, 275, 242

[56] References Cited

U.S. PATENT DOCUMENTS

| | | | |
|---|---|---|---|
| 3,663,682 | 5/1972 | Nitta et al. ............................... | 264/310 |
| 3,919,373 | 11/1975 | Kormendi . | |
| 4,032,600 | 6/1977 | MacAdams et al. ............... | 260/897 B |
| 4,043,721 | 8/1977 | Lemelson . | |
| 4,285,903 | 8/1981 | Lemelson ............................... | 264/310 |
| 4,741,972 | 5/1988 | Hardigg . | |
| 5,147,133 | 9/1992 | White ...................................... | 366/138 |
| 5,261,746 | 11/1993 | Boasso . | |
| 5,445,783 | 8/1995 | Irish et al. . | |
| 5,489,152 | 2/1996 | Rumph . | |
| 5,618,107 | 4/1997 | Bartsch .................................... | 366/279 |
| 5,891,385 | 4/1999 | Cerbelle et al. ........................ | 264/515 |
| 5,911,938 | 6/1999 | El et al. ................................... | 264/261 |

*Primary Examiner*—David P. Bryant
*Assistant Examiner*—Essama Omgba
*Attorney, Agent, or Firm*—Douglas J. Christensen

[57] ABSTRACT

An apparatus requiring storage of a liquid that needs agitation includes a plastic tank that is rotationally molded around an agitation portion. In a preferred embodiment, an asphalt sealcoat application system has such a plastic rotary molded tank mounted on a powered vehicle or trailer and utilizes a pump connected to a hose and spray wand for application of sealcoat on an asphalt surface. The tank is preferably formed of low density polyethylene resin and the agitation portion includes a plurality of paddles and a shaft extending from the interior of the tank for mixing the sealcoat liquid. The polyethylene tank is rotary molded around the assembled agitation portion. The invention includes the methodology of molding the tank, a tank molded by said methodology, and the apparatus for accomplishing said methodology.

9 Claims, 3 Drawing Sheets

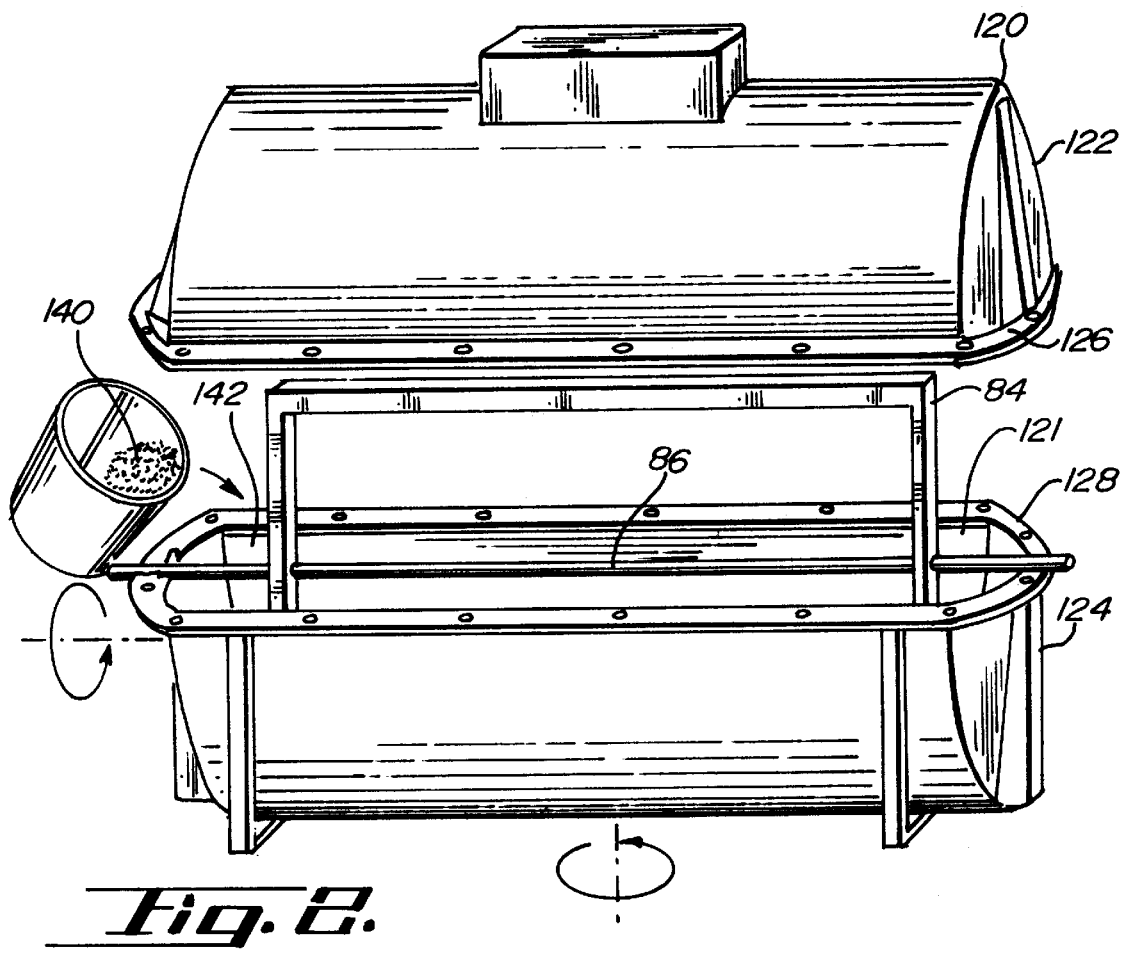
Fig. 2.
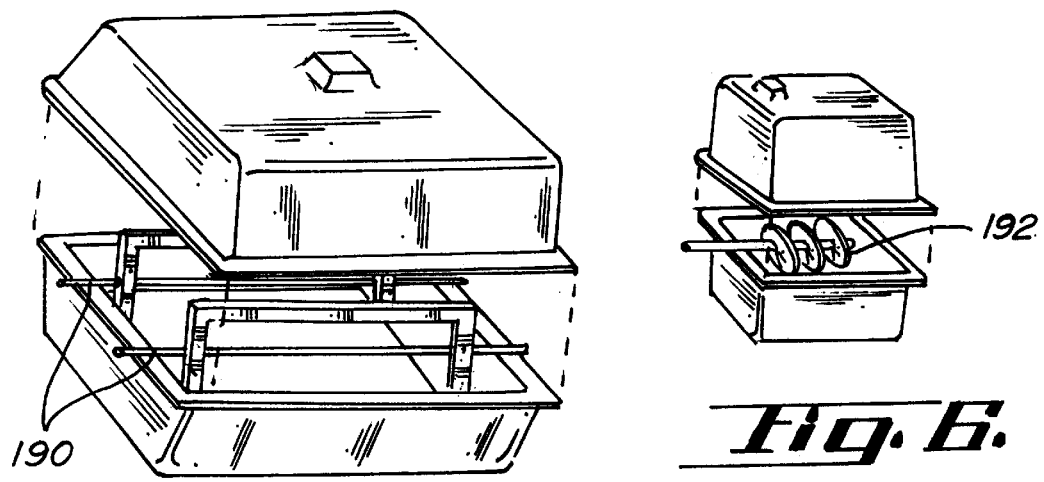
Fig. 5.
Fig. 6.

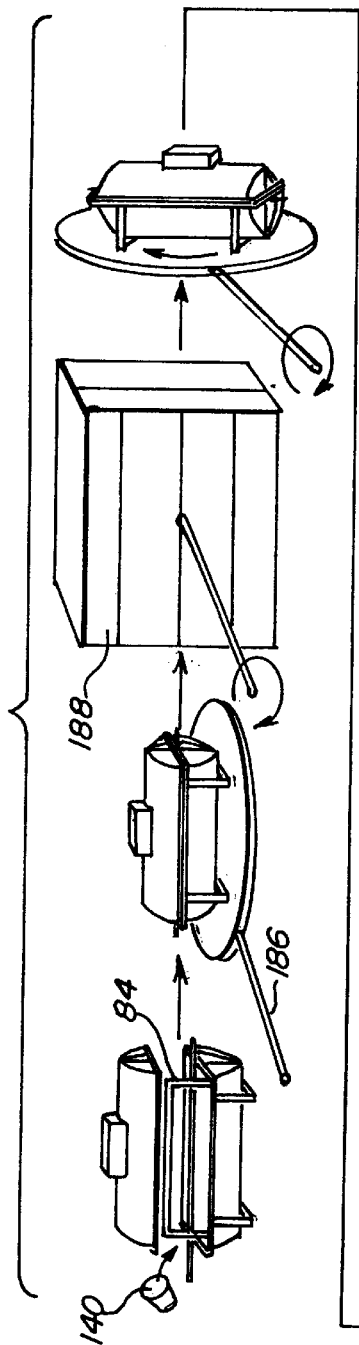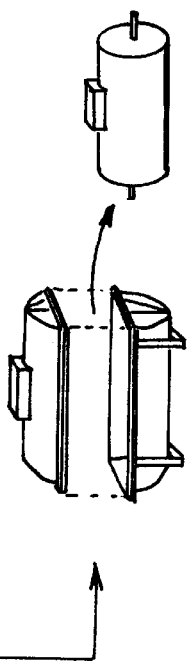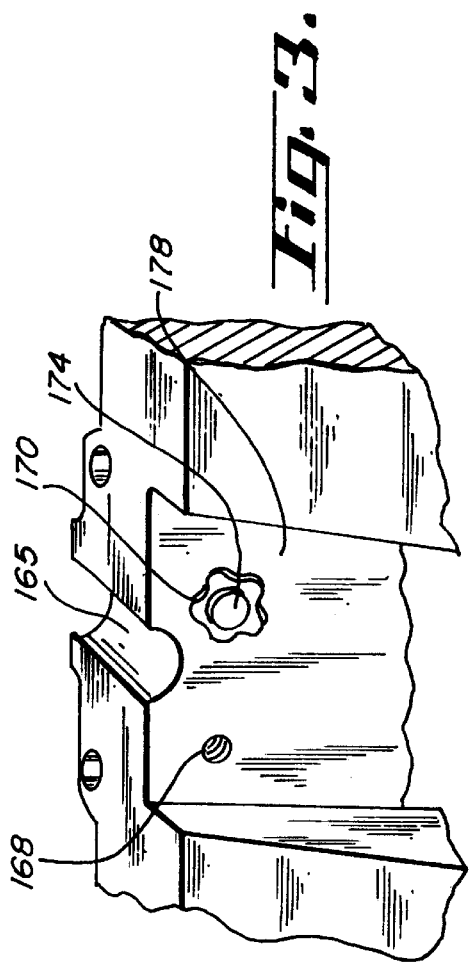

ROTARY MOLDED TANK WITH AGITATION PORTION

BACKGROUND OF THE INVENTION

This invention relates to methods of manufacturing tanks with agitation portions. More particularly it relates to a method of manufacturing a seal coating apparatus including a rotationally molded tank with internal paddles for agitation of sealcoat liquid contained therein.

Asphalt is comprised of essentially two components, aggregate and binder. The aggregate is a measured mixture of stone and sand while the binder is a petroleum derivative. The components are combined, heated and blended in a batch plant. The area where asphalt is to be laid is first prepared by grading and compacting the dirt. Gravel is laid on this area and compacted to a thickness of six to ten inches. The hot asphalt mix is then spread over the area and compacted to a uniform thickness of two to four inches.

As soon as new asphalt is laid, the binder begins to evaporate and decay as it is exposed to the damaging effects of the sun (oxidation), rain and snow. Gasoline, oil leaks and chemicals such as road salts can also have a dramatic effect on the life of the binder. As the binder is destroyed by these external factors, its ability to hold the aggregate together diminishes. This problem takes the form of cracks, distortion and disintegration of the asphalt surface. After three to five years under normal conditions, major deterioration has taken place.

Asphalt sealcoat liquid is a viscus brownish liquid that is applied in a thin layer to asphalt surfaces to protect same from deterioration. Sealcoat preserves the elastic and adhesive characteristics of the asphalt binder by sealing out the oxidizing effects of the sun, salts, and deteriorating effects of water and petroleum spillage. Sealcoat also dries to an attractive uniform flat black color creating a like new appearance. Sealcoat can also be mixed with sand to create a non-skid surface with increased wear characteristics. Sealcoat can also reduce loose stone on an asphalt surface. Generally, asphalt sealcoat is a highly economical method of maintaining and extending the life of asphalt surfaces.

The most common asphalt sealcoat is a water base solution of refine coal tar emulsion, gypsum, clay, and silica. Other additives are available to enhance particular characteristics of the sealer such as the adhesion characteristics, drying time, sand suspension, and the color of the sealer. Prior to application of the sealcoat, it is very important to have the asphalt liquid properly mixed and agitated.

Where an asphalt surface being covered is of substantial square footage it is very difficult to manually mix and agitate large quantities of the sealcoat liquid. Commercial applicators include a self-propelled piece of equipment with a hydraulically agitated tank, an associated pumping system for spraying the sealcoat onto the asphalt surface, and a series of squeegees on the machine. As the operator drives the machine forward, the squeegees drag across the surface leaving a thin, evenly applied layer of sealer on the asphalt. This type of equipment is very expensive and is difficult to use in confined areas.

Additionally, trailer mounted sealcoat application systems are known. Such systems include a large tank of two hundred gallons or more installed on the trailer along with ancillary equipment. The fluid in the tank is pumped through a hose and a spray nozzle for spray application of the sealcoat. Supplemental brushing or use of a squeegee may be performed as desired. It is particularly important with these relatively high quantities of sealcoat liquid that the liquid be properly agitated within the tank. Prior art tanks were typically constructed of steel. Also rotary molded tanks are known in which the agitation portion is assembled inside the blow molded drum through the top access opening. This type of assembly is tedious, time consuming, and difficult.

Fasteners such as inserts with threaded bores or the like which may be attached to the rotary mold portions prior to the mold process are known. Such fasteners are typically exposed at the outer surface of the tank after the molding process.

SUMMARY OF THE INVENTION

An apparatus requiring storage of a liquid that needs agitation includes a plastic tank that is rotationally molded around an agitation portion. In a preferred embodiment, an asphalt sealcoat application system has such a plastic rotary molded tank mounted on a powered vehicle or trailer and utilizes a pump connected to a hose and spray wand for application of sealcoat on an asphalt surface. The tank is preferably formed of polyethylene resin and the agitation portion includes a plurality of paddles and a shaft extending from the interior of the tank for mixing the sealcoat liquid. The polyethylene tank is rotary molded around the assembled agitation portion. The invention includes the methodology of molding the tank, a tank molded by said methodology, and the apparatus for accomplishing said methodology.

The internal mold periphery and thus the finished molded tank is generally shaped as elongate cylinder. The agitation portion comprising a shaft extending coaxially with the axis of the tank is placed in the interior of the mold portions. After the mold process the shaft extends out both ends of the completed molded tank. Appropriately spaced threaded fasteners positioned around the exit of the shaft from the tank allow fastening of a seal and bearing.

An advantage and feature of the invention is that the plastic rotationally molded tank is more economically manufactured than conventional plastic tanks.

A further advantage and feature of the invention is that the agitation portion may be unitary and integral, such as by welding, within the integral plastic tank which may have a very restricted tank opening. This provides for less maintenance and less failures of the agitation portion. Previous agitation portions placed in such integral plastic tank were assembled inside the tank after molding with fasteners such as nuts and bolts. The absence of nuts and bolts that hold the components of the agitation portion together minimizes excessive accumulation of sealcoat on the agitation portion.

A further advantage and feature of the invention is that the method may be used for multiple shafts each with separate agitation members extending from a single integral tank.

BRIEF DESCRIPTION OF THE DRAWINGS

FIG. 2 is a perspective view of the mold portions to manufacture a tank consistent with the invention.

FIG. 3 is a detailed view of a section of a mold portion closing the exit point of the shaft from the mold.

FIG. 4 is a schematic view of steps involved in the invention.

FIG. 5 is a perspective view of an additional tank mold in accordance with the invention.

FIG. 6 is a perspective view of an additional tank mold in accordance with the invention.

DETAILED SPECIFICATION

Figure 1:
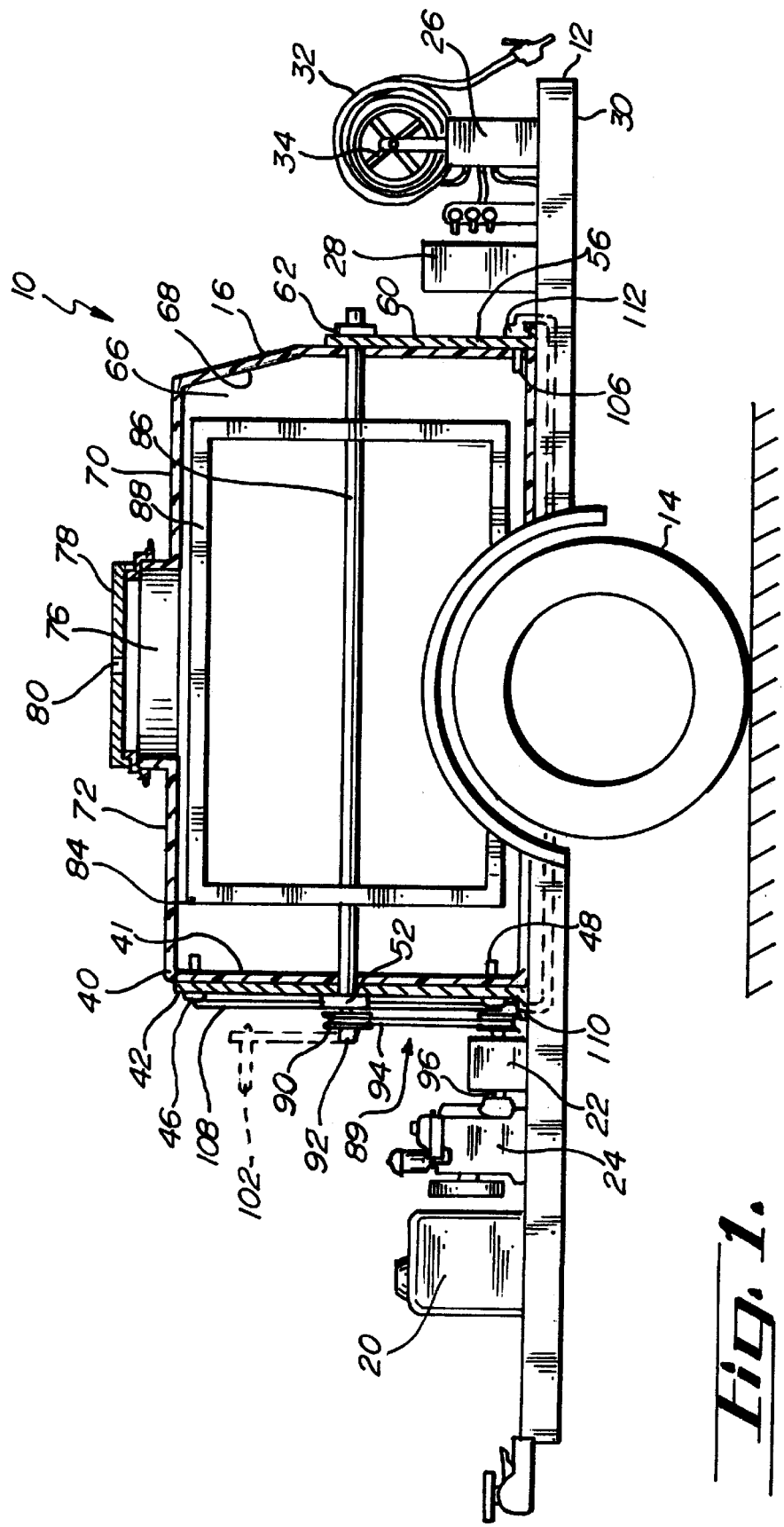
FIG. 1 is a front side elevational view of a trailer mounted tank according to the invention.

Referring to FIG. 1 a trailer mounted sealcoat system in accordance with the invention is shown and is generally designated with the numeral 10. Details of the tank are shown in this cut-away view. The apparatus 10 comprises a trailer 12 with wheels 14 attached to a base or frame 15 which supports the rotationally molded tank 16. Also mounted on the base 15 is a water tank 20, a hydraulic motor 22 driven by a gasoline engine 24, and a fluid pump 26 which is driven by compressed air from an air compressor 28. A hose 32 on a reel 34 is utilized to spray the sealcoat.

The tank is elongate and substantially cylindrical shaped with a first end 40 which has a box portion 41 for facilitating attachment of a mounting bracket 42 and also an inlet port 46, an outlet port 48, and a seal/bearing 52. Similarly, the back end has a box portion 56 which facilitates attachment to the mounting bracket 60 and connection of the bearing and/or seal 62.

The tank has an open interior 66, an inner surface 68, an exterior surface 70. Located at the top 72 of the tank is an access port 76 with a lid 78 with a vent 80. The access port is utilized for filling the tank and cleaning and maintaining the interior of the tank and components therein.

Positioned within the tank is an agitation portion 84 which comprises a shaft 86, a plurality of agitation members configured as paddles 88 welded to or otherwise suitably attached to the shaft 86. The agitation portion is rotated by way of a drive means 89 comprising a pulley 90 attached to the first end 92 of the shaft. The pulley is connected by way of a belt 94 or other suitable means to the motor 22. In this case the motor is a hydraulic motor in which hydraulic pressure is provided by way of a gasoline motor 24 and is coupled by way of a hydraulic line 96. Other drive means such as a more direct coupling to the gasoline motor, or an electric motor or a pneumatic motor are also included within the scope of the drive means. An alternative to a powered drive means as shown is a hand crank 102 shown in dashed lines. The inlet 46 and outlet 48 and 106 are suitably connected with tubing 108, 110, 112 to the liquid pump 26. Said tubing lines maybe placed within the frame of the trailer. The pump is suitably an air operated double diaphragm pump such as the M-2 or M-4 model pumps available from Wilden Pump and Engineering Company, 22069 Van Buren Street, Grand Terrace, Calif. 92313.

Referring to FIG. 2, details of the mold 120 in which the tank of FIG. 1 is manufactured are shown. The mold 120 has a mold cavity 121 and comprises a plurality of mold portions 122, 124. The mold portions engage together at their respective flanges 126, 128. The agitation portion 84 is placed within the open interior before closing of the mold portions. Additionally, before closing of the mold portions plastic resin 140 is provided in appropriate amounts to the mold cavity 142. The amount of resin provided is calculated to provide a suitable wall thickness of the finished tank. Three-eighths of an inch has been found to be suitable for sealcoat tank applications. Low density polyethylene resin is utilized in the preferred embodiment.

Referring to FIG. 3 is a detailed view of an end of one of the mold portions illustrating a shaft receiving recess 165, a aperture 168 for use in securing in the mold cavity a threaded fastener 170. A bolt or stud which extends through the aperture to support the threaded fastener 170 adjacent to the interior surface 178 of the mold portion. When the resin flows about the interior surface 178 and hardens, the fastener is embedded in said plastic resin. The stud or bolt is then removed from the exterior of the mold leaving the threaded fastener to attach, for example, the monitoring bracket 60 and/or the bearing 62. The recess 165 has a corresponding recess on the upper mold portion not shown in this view.

FIG. 4 shows a schematic view of fundamental steps involved in the method of manufacturing the tank with the internal agitation portion. After the addition of the resin 140 and the appropriate placement of the agitation portion 84 the mold portions are suitably sealed together and attached to a rotary mold fixture 186 for transport into an oven 188. During the heating of the mold portions, in the oven, the fixture 186 rotates the mold in two axis so that the melting resin will provide uniform coverage over the interior surfaces of said mold portions. After an appropriate time in the oven, the fixture moves the mold out of the oven and continues to rotate the mold during cooling. After the resin has cooled sufficiently, the rotation is stopped and the molded tank is removed from the mold.

Referring to FIGS. 5 and 6, additional molds are shown which illustrate that multiple agitation portions 190 may be utilized in a mold and that agitation members other than the straight paddles of FIGS. 1 and 2 are contemplated and included within the scope of the invention. FIG. 6 illustrates a spiral agitation member 192.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

As is apparent, the methodology and tanks disclosed herein are suitable for applications other than sealcoat apparatuses.

I claim:

1. A method of manufacturing a rotationally molded tank with a tank opening and an internal agitation portion, the method comprising the steps of:
   a) placing an assembled agitation portion comprising a shaft into an open tank mold;
   b) adding plastic resin into the open mold;
   c) closing the mold;
   d) heating and rotating the mold whereby the plastic resin is melted and is distributed along an inside surface of the closed mold;
   e) allowing the mold and melted plastic resin to cool thereby solidifying plastic on the inside surface of the closed mold in a configuration of the tank;
   f) removing the solidified plastic from the mold; and
   g) mechanically connecting the agitation portion to a drive component whereby the agitation portion may be moved to agitate liquid in the tank.

2. The method of claim 1 wherein the agitation portion has a plurality of paddles integrally connected to the shaft.

3. The method of claim 1 wherein the agitation portion has a size such that said agitation portion does not fit through the tank opening.

4. The method of claim 1 further comprising the step of mounting the tank on a trailer.

5. The method of claim 1 further comprising the step of extending the shaft of the agitation portion outwardly from the tank and the step of coupling the shaft to a power source.

6. The method of claim 1 further comprising the step of attaching a bearing onto the plastic tank with the shaft extended therethrough.

7. The method of claim 1 wherein the shaft has two ends and the method further comprises the step of positioning the agitation portion such that each end of the shaft extends exterior the tank wall and tank ends.

8. The method of claim 7 further comprising attaching a pair of bearings, one to each of the tank ends and extending each of the two ends of the shaft through one of said pair of the bearings.

9. A method for manufacturing a rotationally molded enclosure with an access opening and an internal agitation portion positioned in the interior of the tank and extending therefrom, the method comprising the steps of:

a) providing a plurality of tank mold portions assembleable into a mold with an internal surface configured for forming a tank;

b) positioning a shaft with mixing portions thereon within the mold, the shaft having an end extending beyond the internal surface;

c) putting plastic resin in the mold;

d) heating the mold sufficiently to melt the resin;

e) rotating the mold sufficiently to coat the interior surface of the mold;

f) allowing the mold and the plastic resin to cool thereby solidifying the plastic resin; and g) removing the solidified plastic resin from the mold.

* * * * *